Feb. 6, 1940.  C. R. HANNA  2,189,633
SPEED REGULATOR
Filed Sept. 16, 1937
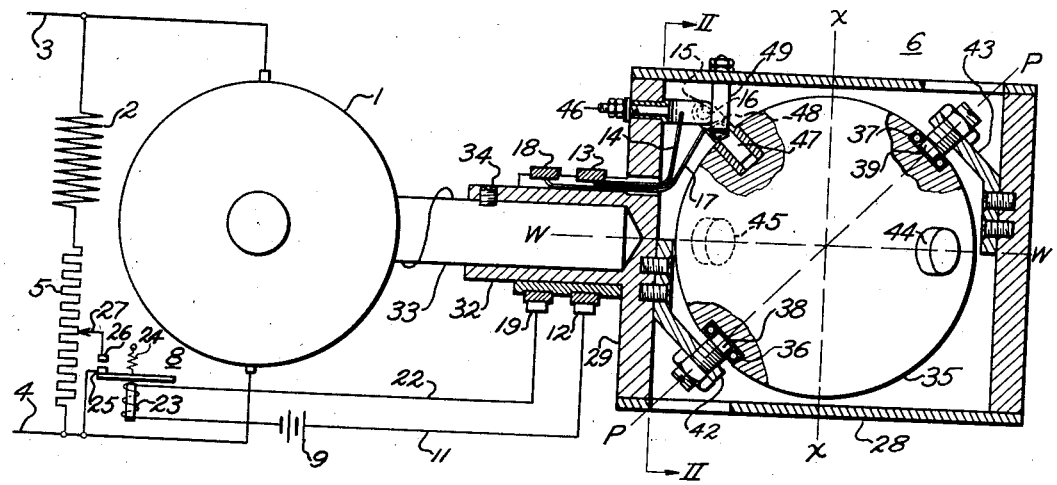
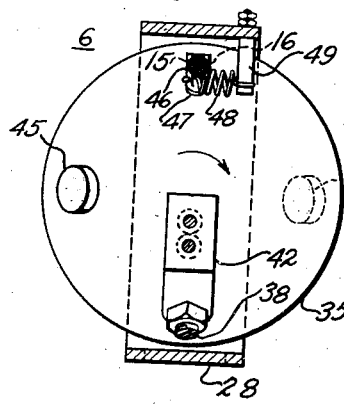
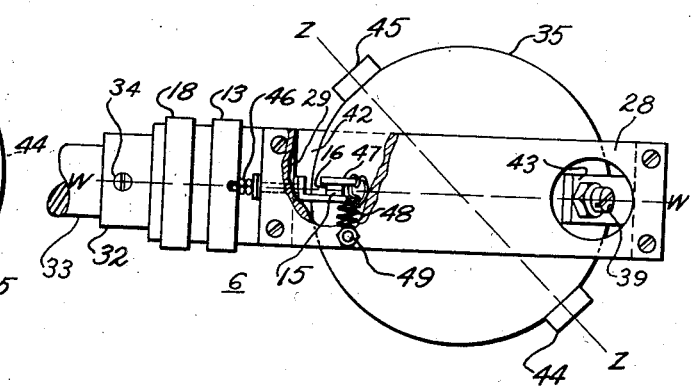
WITNESSES:
E. F. Oberheim.
F. E. Hardy
INVENTOR
Clinton R. Hanna.
BY Ezra W. Savage
ATTORNEY Patented Feb. 6, 1940

2,189,633

UNITED STATES PATENT OFFICE 2,189,633

SPEED REGULATOR

Clinton R. Hanna, Wilkinsburg, Pa., assignor to Westinghouse Electric & Manufacturing Company, East Pittsburgh, Pa., a corporation of Pennsylvania Application September 16, 1937, Serial No. 164,158

7 Claims. (Cl. 200—80)

My invention relates to centrifugal speed governors for controlling the speed of regulated devices, such as prime movers, motors, and the like.

Governors of the centrifugal type usually possess hunting characteristics caused by the necessity of an appreciable departure in the speed of the regulated device from its desired value before a corrective force is established that is of sufficient intensity to develop the desired correction in speed, and the inability of this corrective force, once it is established, to discontinue its influence prior to a completion of the correction.

In such regulators, the accuracy of regulation may be greatly improved if the speed controlled device is responsive not only to variations in speed from the desired value, but also to the acceleration that anticipates such speed changes and which occur as the speed of the regulated member starts away from its desired value. The force of acceleration may become effective before any substantial change in speed has occurred and may, therefore, be employed earlier in the speed correcting cycle to introduce a corrective influence into the regulator system than could be introduced by a regulator responsive to speed only.

It is an object of my invention to provide a centrifugal speed governor that is responsive both to the speed of the regulated quantity, and to the rate of change of speed from the desired value.

It is a further object of my invention to provide a speed regulator employing a single inertia element having one degree of freedom of motion, that is responsive to a centrifugal component of force and to an acceleration component of force.

Another object of my invention is to provide a centrifugal speed governor of the indicated character that is balanced against gravity vibrations.

My invention will be better understood by reference to the accompanying drawing, in which:

Figure 1 is a diagrammatic view of one preferred embodiment of the invention showing parts in section;

Fig. 2 is a sectional view taken along the line II—II in Fig. 1; and,

Fig. 3 is a plan view of the regulator.

Referring to the drawing, the regulated device illustrated is shown as an electric motor having an armature winding 1 and a field winding 2 that are supplied with electrical energy from a circuit represented by conductors 3 and 4, a variable resistor 5 being shown in series circuit relation with the field winding 2.

A speed regulator, indicated generally at 6, is connected to be driven in accordance with the speed of the motor to be regulated for varying the effective value of the field regulating resistor 5 through operation of a relay 8. The relay is controlled by a circuit extending from a battery 9, through conductor 11, brush 12, selector ring 13, conductor 14, contact members 15 and 16, conductor 17, slip ring 18, brush 19, conductor 22, and the winding 23 of the relay 8 to the other terminal of the battery 9. It will be noted that when the regulator contact members 15 and 16 are in engagement, the relay winding 23 is energized, causing the relay armature to be moved against the bias of the spring 24 to separate the relay contact members 25 and 26 and insert that portion of the resistor 5 lying between the adjustable contact member 27 and the conductor 4 in the field winding circuit to decrease the excitation thereof. The contact member 27 may be adjusted to include any desired portion of the resistor 5 in shunt to the relay contact members.

The regulating mechanism 6 comprises a revolvable supporting frame 28, one end plate 29 of which is provided with a sleeve 32 that fits over the motor shaft 33 and is fastened thereto by a set screw 34. An inertia member, or rotor, 35, which is here illustrated as spherical in shape, is pivotally mounted by means of ball bearings 36 and 37 that are carried by studs 38 and 39 mounted on brackets 42 and 43, respectively, and supported from the frame 28 to align the pivot axis P—P of the bearings at an angle to the axis of rotation W—W, and so positioned that the intersection of these two axes coincides with the center of mass of the rotor 35.

In order to provide a centrifugal couple about the axis X—X that varies with the speed of rotation of the regulator mechanism, weights 44 and 45 are added to the rotor and positioned diametrically opposite the center thereof on an axis Z—Z, which is here illustrated as being at an angle of 45° to the axis of rotation W—W. The plane of intersection of the axes W—W and P—P is substantially at right angles to a plane containing the axes W—W and Z—Z.

The contact member 15 is shown mounted on a stud 46 carried by the frame 28 and so positioned as to engage the contact member 16 mounted on a stud 47 carried by the rotor 35. A spring 48 is provided, one end of which engages the stud 47 carried by the rotor 35 and the other end of which engages a stud 49 extending downwardly from the top plate of the frame 28, as viewed in Fig. 1, for biasing the contact members 15 and 16 into engagement.

As the frame 28 containing the rotor 35 is rotated about the axis W—W in accordance with the speed of rotation of the prime mover, the weights 44 and 45 produce a couple due to centrifugal force, the weight 44 pulling downwardly as viewed in Fig. 3 and the weight 45 upwardly, thus producing a clockwise torque about an axis through the center of the sphere at right angle to the plane of the drawing, as shown in Fig. 3, and represented by the vertical axis X—X in Fig. 1. This centrifugal couple about the axis X—X has a component of force about the pivot axis P—P tending to move the rotor 35 in a direction to separate the contact members 15 and 16 against the force of the spring 48 when the centrifugal force reaches a value sufficient to overcome the force of the spring.

When the motor is revolving at a constant speed, the inertia torque of angular acceleration of rotation of the rotor 35 about the axis of rotation W—W is zero. If the motor tends to increase its speed, the inertia of the rotor 35 causes an inertia torque about the axis W—W due to its inherent tendency to resist a change in speed. The rotor is revolved in a direction such that the inertia torque of acceleration has a component of force about the axis P—P in a direction to cause separation of the contact members 15 and 16 against the force of the spring 48. In the arrangement of the contact members shown in Fig. 1, the frame 28 will be rotated in a direction such that the top of the frame 28 will move toward the reader and the contact member 15 tends to move away from the contact member 16.

It will be seen, therefore, that the force acting at the contacts against the spring 48 is determined by two components, one of which is proportional to the angular velocity or speed, and the other to angular acceleration or rate of change in speed. In the normal operation of the regulator, the motor constantly varies its speed slightly within narrow limits to cause the intermittent engagement and separation of the contact members 15 and 16 to vary the ratio of time between the short circuit and the inclusion in the field winding circuit of that portion of the resistor 5 between the contact member 27 and the conductor 4. As the speed of the motor 1 starts to increase above its desired value, the angular torque of acceleration about the axis W—W produces a component about the pivot axis P—P in a direction to separate the contact members 15 and 16 against the bias of the spring 48. The component of torque of acceleration about the pivot axis P—P acts in the same direction as the component of torque due to centrifugal force which is against the bias of the spring 48, but anticipates the force due to a change in speed so that the combined forces of these two components of torque cause the contact members 15 and 16 to separate earlier than would be the case were they responsive to the centrifugal force alone. Upon separation of the contact members 15 and 16, the relay 8 is deenergized and short circuits that portion of the resistor 5 between the contact 27 and the conductor 4 to strengthen the excitation of the field winding 2 and decrease the speed of the motor. Correspondingly, if the motor decreases its speed below the desired value, the negative angular acceleration, or deceleration of the motor shaft is in a direction to cause an earlier engagement of the contact members 15 and 16, thus operating the relay 8 to insert the lower portion of the resistor 5 in the field winding circuit earlier than would be the case were the contact members actuated by a change in centrifugal force alone, causing the speed of the motor to be increased.

It will be appreciated that the effect of the angular torque of acceleration or deceleration about the axis W—W, and which acceleration or deceleration is effective to produce a change in speed in the one or the other direction develops a component of force on the rotor 35 to rotate it about the axis P—P in the same direction as would the component of force resulting from the change in centrifugal force about the axis X—X caused by the resulting increase or decrease in speed. Thus the acceleration or deceleration of the controlled motor 1 causes an operation of the contact members 15 and 16 in anticipation of appreciable speed changes to initiate corrective actions and thereby maintain a more accurate speed and prevent hunting action of the controlled motor.

It will also be appreciated that, once the corrective action has been initiated, and the resulting correction begins to be felt on the regulated member, the component of force responsive to the inertia torque of acceleration disappears rapidly so that the total regulating force is reduced prior to a completion of the desired correction. The acceleration component, therefore, aids both in starting a corrective action in anticipation of an error in speed, and in ending the corrective action in anticipation of the completion of the corrective influence. This characteristic starting operation decreases the permitted error and increases the sensitivity of the regulator, and at the same time prevents or reduces hunting action.

Many changes in the apparatus and circuits disclosed will be apparent to those skilled in the art within the spirit of my invention, and I do not wish to be limited otherwise than by the scope of the appended claims.

I claim as my invention:

1. In a speed governor for controlling the speed of a rotating member, a single inertia element positioned to revolve about an axis of rotation at a speed that varies with the speed of the regulated member, and mounted with freedom of motion about an axis at an angle to the axis of rotation, said inertia element being provided with two smaller masses diametrically disposed on opposite sides of the center of mass of the element along an axis displaced from the axis of rotation to provide a couple about an axis at right angles to the axis of rotation due to centrifugal force of rotation about the axis of revolution of the inertia elements having a component of force about the axis of freedom of motion of the inertia element, biasing means for opposing movement of the inertia element about its axis of freedom in response to centrifugal force, and means controlled by movement of the inertia element about its axis of freedom.

2. In a speed regulator for controlling the speed of a rotating member, a single inertia element so mounted as to revolve about an axis of rotation at a speed that varies with the speed of the regulated member, and mounted with freedom of motion about an axis at a substantial angle to the axis of rotation, the said mass of said inertia element being arranged symmetrically along an axis angularly displaced from the axis of rotation and from the axis of freedom of motion to provide a couple due to centrifugal force about an axis at right angles to the axis of rotation having a component of force about the axis of freedom of motion, biasing means for opposing movement of said inertia element in response to centrifugal force, the inertia torque of the inertia element due to acceleration being in a direcion to aid the centrifugal force, and means controlled by movement of the inertia element about its axis of freedom.

3. In a speed regulator for controlling the speed of a rotating member, a single inertia element mounted with a revolvable frame that is rotated at a speed that varies with the speed of rotation of the regulated member, said element being mounted with freedom of motion about an axis at an angle to the axis of rotation and having its mass distributed to be balanced against gravity vibration and along an axis at an angle to the axis of rotation and to the axis of freedom to produce a couple due to centrifugal force about an axis at right angles to the axis of rotation, biasing means for opposing the movement of said inertia element in response to centrifugal force, and means controlled by movement of the inertia element about its axis of freedom.

4. In a speed regulator for controlling the speed of a rotating member, a single inertia element having a large moment of inertia mounted in bearings in a rotatable frame, said bearings being aligned along an axis at a substantial angle to the axis of rotation of the frame, the mass of said element being so distributed about the axis of said bearings as to be balanced against gravity vibration and so distributed along an axis at a substantial angle to the axis of rotation and to the axis of said bearings as to form a couple about an axis at right angles to the axis of rotation having a component about the axis of the bearings, the inertia torque of the inertia element due to acceleration being in a direction to aid the centrifugal force, a contact member carried by said frame and a cooperating contact member carried by said inertia element, biasing means for opposing movement of said inertia element relative to the frame in response to centrifugal force and the inertia torque of acceleration, and means for rotating said frame at a speed corresponding to the speed of the rotating member to control the operation of said contact members.

5. In a regulator, in combination, an inertia element substantially in the form of a sphere having a large moment of inertia, a revolvable frame for supporting said inertia element in bearings aligned at an angle of substantially 45° with an axis of rotation of the frame and inertia member, said inertia mass having equal weights diametrically disposed on opposite sides of the center of mass of the sphere along an axis disposed substantially 45° from the axis of rotation in a plane that is substantially 45° from the axis of the bearings for producing a couple due to centrifugal force about an axis at right angles to the axis of rotation that has a component of force about the axis of the bearings in the same direction as the component of force of the torque of acceleration of the inertia member about its axis of revolution, a contact member carried by said frame and a cooperating contact member carried by said inertia element, biasing means for opposing the movement of the inertia element relative to the frame in response to the centrifugal force and the torque of acceleration of the inertia member, and means for rotating said frame and inertia element at a speed corresponding to the value of the regulated quantity to control the operation of said contact members.

6. In a speed regulator for controlling the speed of a rotating member, a single inertia element mounted in a supporting structure that is revolved at a speed that varies in accordance with the speed of the regulated member, said inertia member being mounted in said inertia structure to possess an axis of freedom of motion that is at a substantial angle to the axis of rotation, biasing means for urging said inertia member about its axis of freedom, said inertia member being responsive to movement about its axis of freedom against the urge of said biasing means upon acceleration of said supporting structure and to a centrifugal couple established by the distribution of the mass of the inertia element about its axis of rotation and being free from any other dynamic couple and free from gravity unbalance about its axis of freedom, and means actuated upon movement of said inertia element about its axis of freedom.

7. In a regulator for controlling the value of a regulated quantity, a single inertia element mounted in a supporting structure that is revolved at a speed that varies in accordance with the value of the regulated quantity, said inertia member being mounted in said supporting structure to possess an axis of freedom of motion, said inertia member being responsive to movement about its axis of freedom upon acceleration of said supporting structure and to a centrifugal couple established by the distribution of the mass about its axis of rotation and being free from any other dynamic couple and free from gravity unbalance about its axis of freedom, and means actuated by movement of said inertia element about its axis of freedom.

CLINTON R. HANNA.